(12) United States Patent
Koyama

(10) Patent No.: US 11,012,020 B2
(45) Date of Patent: May 18, 2021

(54) ELECTRONIC CONTROL UNIT

(71) Applicant: DENSO CORPORATION, Aichi-pref. (JP)

(72) Inventor: Yutaka Koyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/595,544

(22) Filed: Oct. 8, 2019

(65) Prior Publication Data

US 2020/0169208 A1 May 28, 2020

(30) Foreign Application Priority Data

Nov. 26, 2018 (JP) .............................. JP2018-220241

(51) Int. Cl.
*H01M 10/42* (2006.01)
*H02P 25/18* (2006.01)
*H02P 27/06* (2006.01)
*B60L 3/00* (2019.01)
*B60L 3/04* (2006.01)
*B60L 50/60* (2019.01)

(52) U.S. Cl.
CPC ............ *H02P 25/186* (2013.01); *B60L 3/003* (2013.01); *B60L 3/04* (2013.01); *B60L 50/60* (2019.02); *H02P 27/06* (2013.01); *B60Y 2200/91* (2013.01)

(58) Field of Classification Search
CPC .......... H02P 27/06; H02P 29/028; B60L 3/04; B60L 50/60; B60L 3/0092; B60Y 2200/91; Y02T 10/70
See application file for complete search history.

(56) References Cited

U.S. PATENT DOCUMENTS

| | | | | |
|---|---|---|---|---|
| 2006/0097577 A1* | 5/2006 | Kato | ................... | F02N 11/0866 307/10.1 |
| 2007/0023215 A1* | 2/2007 | Ueda | ........................ | B03B 9/06 180/167 |
| 2009/0096410 A1* | 4/2009 | Sakurai | ................... | B60L 50/51 320/104 |
| 2010/0315040 A1* | 12/2010 | Sakurai | ................... | B60L 53/11 320/109 |
| 2012/0062158 A1* | 3/2012 | Itou | ......................... | B60L 50/16 318/400.21 |
| 2014/0062352 A1* | 3/2014 | Wang | ..................... | A01D 34/78 318/139 |
| 2017/0274796 A1* | 9/2017 | Nomura | .................. | B60L 58/12 |

FOREIGN PATENT DOCUMENTS

| | | |
|---|---|---|
| JP | 2008-206288 A | 9/2008 |
| JP | 2019-161991 A | 9/2019 |

\* cited by examiner

*Primary Examiner* — Muhammad S Islam
(74) *Attorney, Agent, or Firm* — Posz Law Group, PLC

(57) ABSTRACT

An electronic control unit includes a first calculator and a second calculator. When the first calculator has an abnormality, even if a start switch of a vehicle is switched OFF by a driver of the vehicle, the second calculator is configured to maintain system main relays on a positive terminal side and a negative terminal side in a conductive state in case that a certain travel continuation condition is fulfilled. Therefore, even when the driver has erroneously switched OFF the start switch, an electric power is suppliable to an inverter via the system main relays kept in the conductive state, thereby the vehicle is travelable by using a vehicle travel-power motor.

17 Claims, 7 Drawing Sheets

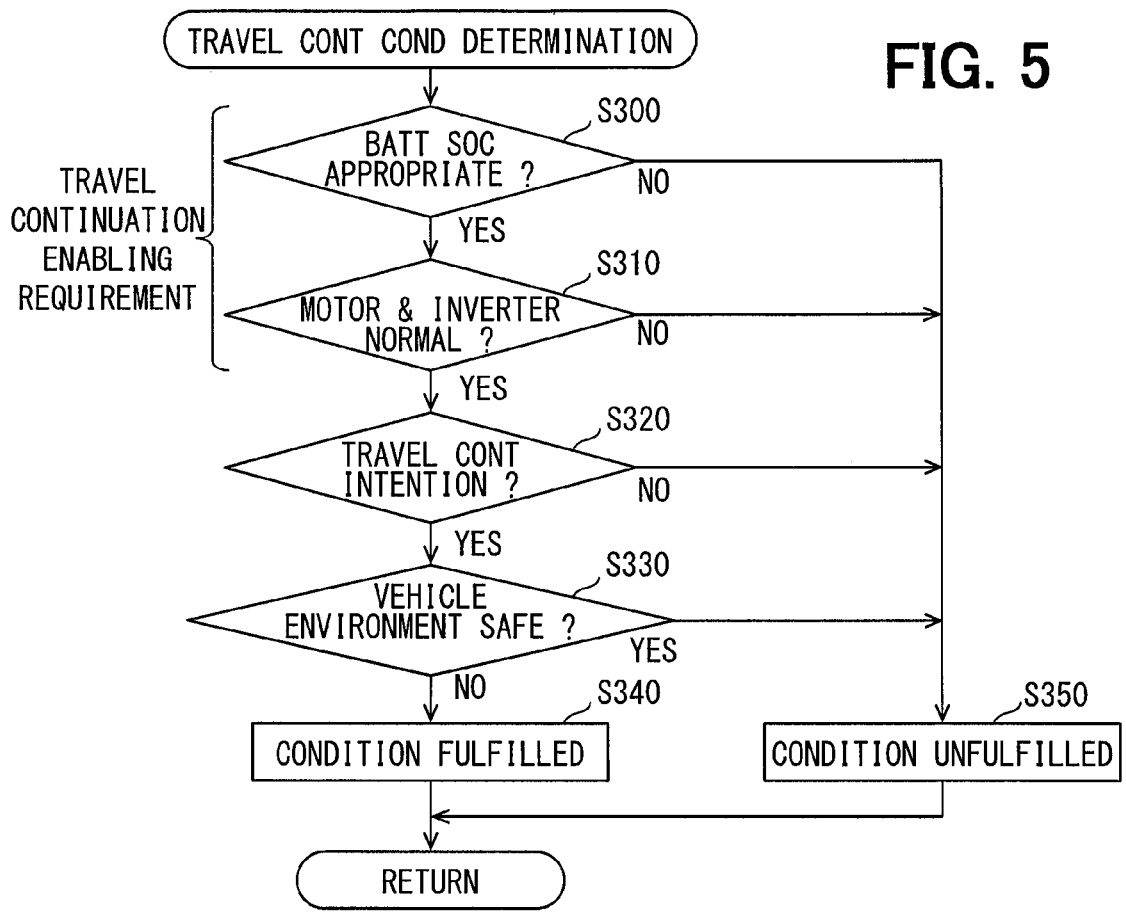

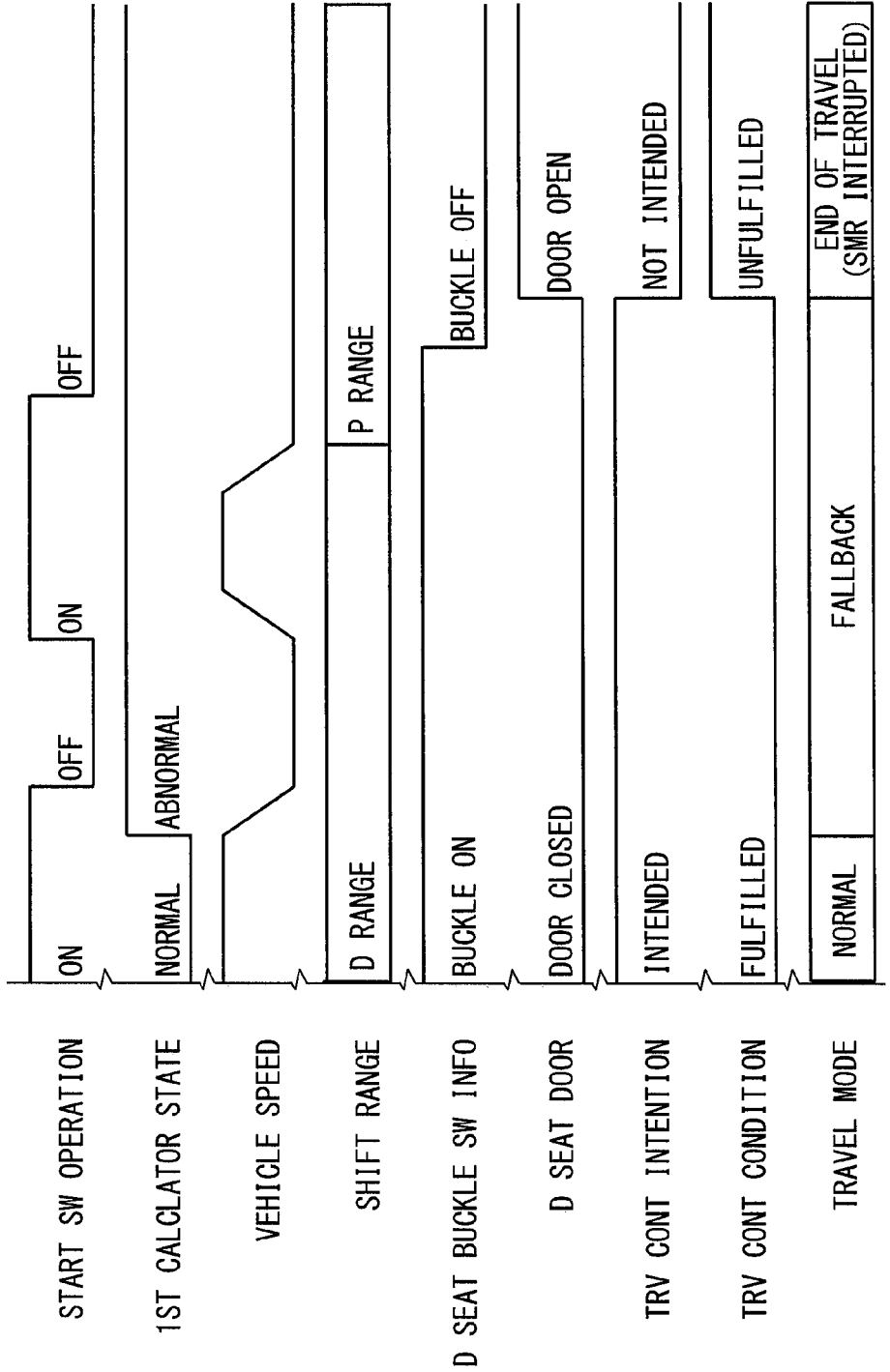

SCENE2 : START SW OFF OPERATION AT INTERSECTION

ELECTRONIC CONTROL UNIT

CROSS REFERENCE TO RELATED APPLICATION

The present application is based on and claims the benefit of priority of Japanese Patent Application No. 2018-220241, filed on Nov. 26, 2018, the disclosure of which is incorporated herein by reference.

TECHNICAL FIELD

The present disclosure generally relates to an electronic control unit applied to a vehicle that includes a relay device for switching an electrically conductive state and a non-conductive state of a connection between an in-vehicle high voltage battery and an inverter that drives a motor (i.e., vehicle travel-power motor) for enabling a travel of the vehicle.

BACKGROUND INFORMATION

The related art discloses a vehicle control device for controlling a main relay in a hybrid vehicle or an electric vehicle, which includes an inverter connected to a vehicular electric motor, a main battery for supplying electric power to the inverter, and the main relay for electrically conducting and interrupting a connection between the main battery and the inverter.

The vehicle control device is provided with a conductive state holding circuit that holds a conductive state of the main relay for a predetermined period of time when (i) the main relay is in the conductive state and (ii) an interruption instruction is output from a control electronic control unit (ECU) to the main relay. Even when the control ECU is reset while the vehicle is traveling and the interruption instruction is output to the main relay by the holding circuit, the main relay can be held in the conductive state for a predetermined time without being shut off. Therefore, when the control ECU "reboots" during the holding period of the main relay under control of the holding circuit (i.e., when the ECU could resume its operation within such a period), travel of the vehicle is continuable (i.e., the vehicle can continue to travel) without drawing attention of the driver to such an interruption.

However, in the related art, when the control ECU is not recoverable from abnormality by the reset of the ECU, the control ECU may be kept from normally operating after the lapse of the holding period by the holding circuit, thereby resulting in an interruption of the main relay. In such a case, since no electric power is supplied to the inverter, the vehicle may become immobilized. Further, even when a conduction instruction is output from the control ECU during the holding period and the conductive state of the main relay is maintained, (i.e., is kept unchanged) there may also be a possibility that the inverter cannot be appropriately controlled due to the abnormality of the control ECU.

SUMMARY

It is an object of the present disclosure to provide an electronic control unit (ECU) that is capable of securely supplying electric power to an inverter that drives a vehicle travel-power motor when a driver of the vehicle turns OFF a start switch of the vehicle, without increasing a cost of the ECU.

BRIEF DESCRIPTION OF THE DRAWINGS

Objects, features, and advantages of the present disclosure will become more apparent from the following detailed description made with reference to the accompanying drawings, in which:

FIG. 5 is a flowchart of a travel continuation condition determination process of FIG. 2;

FIG. 6 is a diagram of an example of conditions for determining whether or not a driver intends to continue travel;

FIG. 7 is a diagram of an example of conditions for determining whether or not a vehicle environment is safe;

FIG. 8 is a timing chart of an example of control by the second calculator when an abnormality occurs in the first calculator and the driver turns OFF a start switch by mistake.

DETAILED DESCRIPTION

Figure 1:
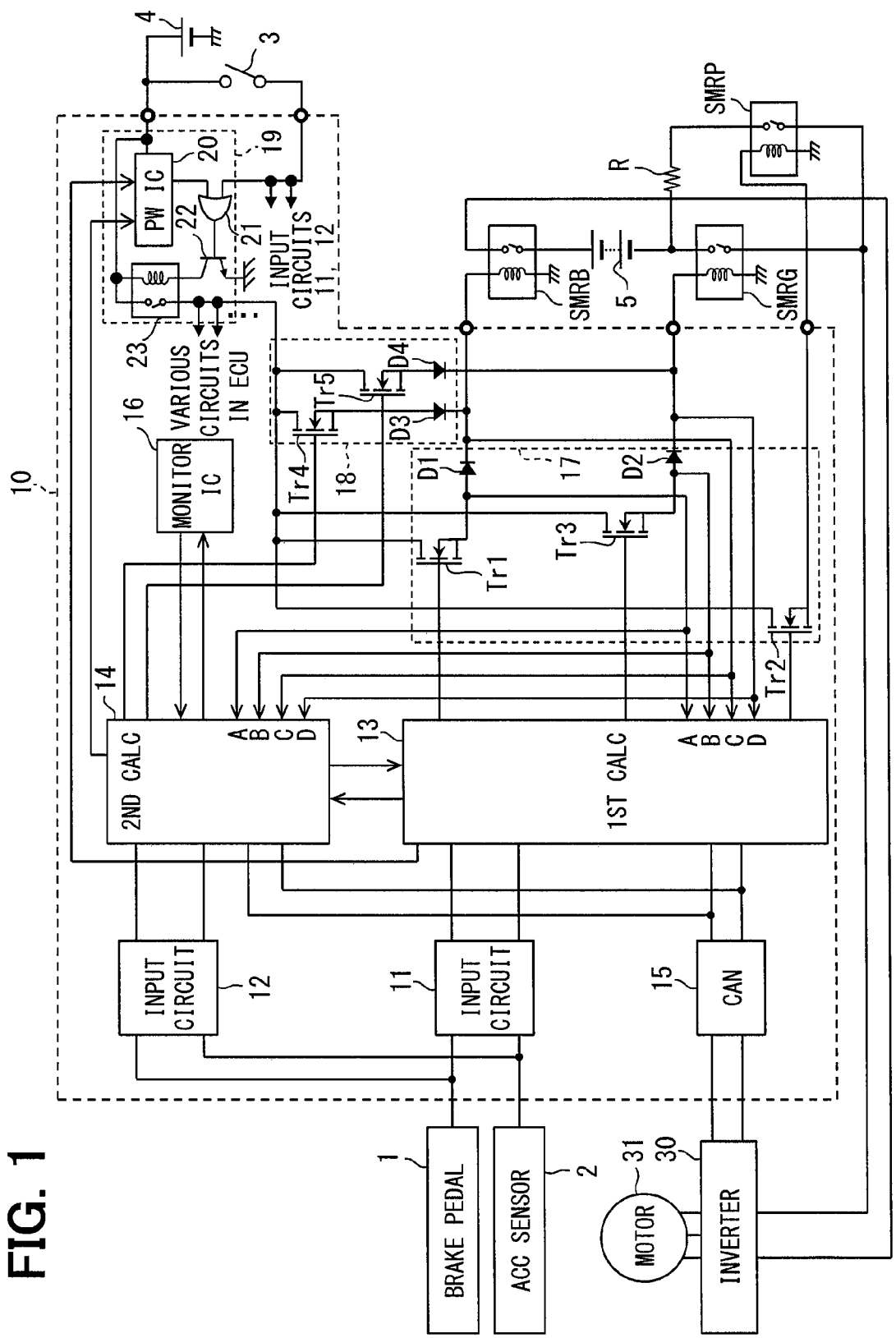
FIG. 1 is a configuration diagram of a control system including an electronic control unit according to an embodiment of the present disclosure.

Hereinafter, an embodiment according to the present disclosure is described based on the drawings. FIG. 1 is a block diagram of the configuration of a control system including an electronic control unit 10 according to the present embodiment and a travel motor 31 controlled by the electronic control unit 10 and system main relays SMRB, SMRG, SMRP, and the like. As shown in FIG. 1, a vehicle to which the electronic control unit 10 according to the present embodiment is applied is an electric vehicle having a three-phase alternating current (AC) travel motor 31 as a power source of travel. An internal combustion engine may additionally be provided as a travel power source of the vehicle, and a motor different from the travel motor 31 may further be provided as a travel power source of the vehicle.

The travel motor 31 is driven by an inverter 30 using electric power supplied from a high voltage battery 5. The high voltage battery 5 is, for example, a lithium battery or a nickel battery, and can supply a direct current (DC) high voltage of several hundred volts. A boost converter may be provided at a position between the high voltage battery 5 and the inverter 30 so that the boost converter can supply a boosted high voltage to the inverter 30.

The inverter 30 converts the direct current corresponding to the supplied DC high voltage to three-phase alternating current, and outputs the alternating current to the travel motor 31. The travel motor 31 is rotationally driven by the three-phase AC current output from the inverter 30. When driving the motor 31, the inverter 30 changes a current value of the three-phase AC current to be output to the motor 31, an output torque of the travel motor 31 can be controlled and the vehicle can travel at a desired speed.

When the rotation of the wheels of the vehicle is transmitted back to the travel motor 31 via an axle and a rotor of the travel motor 31 is rotated, the travel motor 31 functions as a generator to generate an alternating current. The alternating current generated by the travel motor 31 is converted into the direct current by the inverter 30. The high voltage battery 5 is a secondary battery, and stores electric power of the direct current converted by the inverter 30.

A positive terminal side system main relay SMRB is provided at a position between a positive terminal of the high voltage battery 5 and the inverter 30. A negative terminal side system main relay SMRG is provided at a position between a negative terminal of the high voltage battery 5 and the inverter 30. Further, a series circuit of a startup system main relay SMRP and a resistor R is connected in parallel with the negative terminal side system main relay SMRG. The startup system main relay SMRP corresponds to a current restriction relay.

Each of the three system main relays SMRB, SMRG, SMRP has a relay switch and a relay coil.

The three system main relays SMRB, SMRG, SMRP respectively switch the relay switch from an interrupted state to a conductive state when a first relay control signal and/or a second relay control signal from a first calculator 13 and/or a second calculator 14 supply a relay drive signal to the relay coil. When the relay switches of the positive terminal side and the negative terminal side system main relays SMRB and SMRB serving as the first relay are switched to the conductive state, the high voltage battery 5 and the inverter 30 are electrically connected to each other, and supply of the high voltage from the high voltage battery 5 to the inverter 30 and charging of the high voltage battery 5 with an electric current converted to a direct current by the inverter 30 are respectively enabled. Conversely, when each of the system main relays SMRB, SMRG, SMRP is in the conductive state, in case that the first relay control signal and/or the second relay control signal is stopped and the relay drive signal is not supplied, each of the system main relays SMRB, SMRG, SMRP is switched to the interrupted state. In such a case, the high voltage battery 5 and the inverter 30 are electrically disconnected.

The electronic control unit 10 operates by using an electric power supplied from an in-vehicle battery 4 generating a voltage lower than a voltage of the high voltage battery 5, and outputs, for example, an instruction signal that instructs a drive signal (e.g., a PWM signal) for driving each of switching elements that constitute the inverter 30, and outputs a relay drive signal to each of the system main relays SMRB, SMRG, SMRP.

As shown in FIG. 1, the electronic control unit 10 includes input circuits 11, 12, the first calculator 13, the second calculator 14, a CAN (registered trademark, hereinafter the same) communication circuit 15, a monitoring IC 16, output circuits 17, 18, a power supply circuit 19 and the like.

The input circuits 11 and 12 include, for example, circuits for performing input processing such as an amplifier circuit, a sampling circuit, an A/D conversion circuit and the like. The input circuit 11 performs input processing of signals from various sensors and switches such as a brake pedal sensor 1, an accelerator pedal sensor 2, a vehicle speed sensor, a resolver, a start switch 3 of the vehicle and the like to output the processed signal to the first calculator 13. Similarly, the input circuit 12 also performs input processing from various sensors and switches, and outputs the processed signal to the second calculator 14. Here, on behalf of separately providing the input circuits 11 and 12 with the first calculator 13 and the second calculator 14, the same input circuit may be provided for (i.e., shared by) the first calculator 13 and the second calculator 14. The first calculator 13 and the second calculator 14 perform inverter control and relay control to be described later, based on the signals input from various sensors and switches.

The brake pedal sensor 1 detects a depression force of a brake pedal. This depression force may be detected from a brake hydraulic pressure, for example. Alternatively, a depression amount of the brake pedal may be detected as the depression force of the brake pedal. The accelerator pedal sensor 2 detects a depression amount of an accelerator pedal. The vehicle speed sensor detects a travel speed of the vehicle, that is, a vehicle speed. The resolver detects a mechanical angle of the rotor of the travel motor 31. Signals from these sensors may be input directly to the electronic control unit 10, or may be provided from other ECU(s) to the electronic control unit 10.

The CAN communication circuit 15 transmits, to the inverter 30, an instruction signal instructing a drive signal for driving each of the switching elements of the inverter 30, which is output from the first calculator 13 or from the second calculator 14. The inverter 30 generates a drive signal according to the received instruction signal, and drives each of the switching elements to ON and OFF using the drive signal. The first calculator 13 and the second calculator 14 may be configured to generate, for example, a PWM signal as a drive signal, and to directly output the PWM signal to each of the switching elements of the inverter 30.

The first calculator 13 has a computer provided with a CPU, a RAM, a ROM, an I/O, a bus line connecting these components, and the like. In the first processing unit 13, the CPU is configured to perform a program stored in a non-transitory, tangible storage medium such as a ROM while utilizing a temporary storage function of the RAM, to provide an inverter control function and a relay control function for the three system main relays SMRB, SMRG, and SMRP. When the above-described functions are provided, a method corresponding to the program is performed.

Similar to the first calculator 13, the second calculator 14 also has a computer provided with a CPU, a RAM, a ROM, an I/O, and a bus line connecting these components. In addition to the inverter control function and the relay control function for the positive and negative terminal side system main relays SMRB and SMRG, the second calculator 14 also performs the program stored in the ROM to provide a monitor function for monitoring the arithmetic device 13. For example, the monitor function provided by the second calculator 14 may have a watchdog function that counts intervals of service pulses periodically output from the first calculator 13. Alternatively, the monitor function of the second calculator 14 may compare the instruction signal for inverter control in the first calculator 13 with the instruction signal calculated by itself (i.e., the second calculator 14), and may determine whether a difference therebetween is contained within a reference value.

However, in the present embodiment, an arithmetic processing capability of the computer of the second calculator 14 is lower than that of the computer of the first calculator 13. Therefore, normally, the first calculator 13 provides (i.e., the computer in the first calculator 13 is programmed to provide) an inverter control function to drive the travel motor 31, and the second calculator 14 provides (i.e., the computer in the second calculator 14 is programmed to provide) the monitor function to monitor if an operation of the first calculator 13 is normal. When the second calculator 14 determines that the operation of the first calculator 13 is abnormal by its monitor function, the second calculator 14 performs the inverter control on behalf of the first calculator 13. When providing the inverter control function, the second calculator 14 is configured (i.e., programmed) to perform a simpler inverter control compared with the control performed by the first calculator 13 so that, for example, a so-called fallback travel of the vehicle is enabled for the retreat of the vehicle to a safe area. However, the second calculator 14 may have the same arithmetic processing capability as the first calculator 13, and may be configured to perform an inverter control similar to that of the first calculator 13.

When the second calculator 14 determines that the operation of the first calculator 13 is abnormal, the second calculator 14 continuously outputs a reset signal to the first calculator 13. Therefore, when the second calculator 14 performs an inverter control, the first calculator 13 does not output an instruction signal for the inverter control. Thus, in the present embodiment, the instruction signal for the inverter control is prevented from simultaneously output from both the first calculator 13 and the second calculator 14.

Regarding the relay control function for each of the system main relay SMRB, SMRG, SMRP, both of the first calculator 13 and the second calculator 14 are programmed to provide such function during an operation period of the vehicle, i.e., from a start to a stop of the vehicle, for securely preventing a stop of supply of electric power during a travel of the vehicle. Relay control for each of the system main relays SMRB, SMRG, SMRP by the first and second calculators 13 and 14 is described in details later.

The monitoring IC 16 is a so-called ASIC (Application Specific Integrated Circuit), and monitors whether the second calculator 14 is operating normally. For example, the monitoring IC 16 is configured as a watchdog timer that counts the interval of service pulses periodically output from the second calculator 14. In such a case, when the measurement of the interval exceeds a scheduled output interval of the service pulse, the monitoring IC 16 considers that the operation of the second calculator 14 is abnormal and outputs a reset signal to the second calculator 14. On the other hand, when the service pulse is periodically output from the second calculator 14 at the scheduled output interval, the monitoring IC 16 generates a normal signal indicating that the operation of the second calculator 14 is normal, and outputs it to the second calculator 14. Note that a monitoring method of the operation of the second calculator 14 by the monitoring IC 16 is not limited to the method described above, but may also be any known monitoring method, if applicable to the present disclosure.

When the second calculator 14 determines that the first calculator 13 is operating abnormally by its own monitor function, the second calculator 14 confirms whether the second calculator 14 is receiving a monitoring result (i.e., a normal signal) from the monitoring IC 16, which guarantees a normal operation of the second calculator 14. Then, when it is confirmed that the normal signal is received from the monitoring IC 16, the second calculator 14 determines that the operation of the first calculator 13 is abnormal. As described above, since the electronic control unit 10 according to the present embodiment includes the monitoring IC 16, a false determination by the second calculator 14 that the second calculator 14 falsely determines a normally-operating first calculator 13 as abnormally operating is prevented.

The output circuit 17 outputs a relay drive signals to each of the system main relays SMRB, SMRG, SMRP, in response to the first relay control signal output from first calculator 13, for the first calculator 13 to perform the connection sequence of each of the system main relays SMRB, SMRG, SMRP. More specifically, the output circuit 17 includes a first transistor Tr1, a second transistor Tr2, a third transistor Tr3. The first transistor Tr1 outputs the relay drive signal to the positive terminal side system main relay SMRB. The second transistor Tr2 outputs the relay drive signal to the startup system main relay SMRP. The third transistor Tr3 outputs the relay drive signal to the negative terminal side system main relay SMRG. The first calculator 13 outputs drive signals for turning ON the first to third transistors Tr1 to Tr3 respectively as the first relay control signal.

Further, on a connection line connecting the source of the first transistor Tr1 to the positive terminal side system main relay SMRB, the output circuit 17 has a diode D1 that is inserted to a position closer to the source of the first transistor Tr1 than a junction where an output of the output circuit 18 merges to the connection line. In addition, the output circuit 17 has a diode D2 that is inserted to a position closer to the source of the third transistor Tr3 than the junction where an output of the output circuit 18 merges with the connection line between the source of the third transistor Tr3 and the negative terminal side system main relay SMRG. These diodes D1 and D2 are provided to prevent an electric current from flowing into the output circuit 17 from the output circuit 18. Then, one ends of monitor lines are connected respectively to both ends of each of the diodes D1 and D2 in order to measure an inter-terminal potential of each of the diodes D1 and D2, and other ends of those monitor lines are connected to ports A to D of the first calculator 13 and the second calculator 14. More specifically, the other end of the monitor line whose one end is connected to the anode of the diode D1 is connected to the ports A of the first calculator 13 and the second calculator 14. The other end of the monitor line whose one end is connected to the cathode of the diode D1 is connected to the ports C of the first calculator 13 and the second calculator 14. The other end of the monitor line whose one end is connected to the anode of the diode D2 is connected to the ports B of the first calculator 13 and the second calculator 14. The other end of the monitor line whose one end is connected to the cathode of the diode D2 is connected to the ports D of the first calculator 13 and the second calculator 14.

The first calculator 13 and the second calculator 14 monitor the relay drive signal output from the output circuit 17 using the potential between both ends of the diodes D1 and D2 obtained from the ports A to D, and an OFF failure of the first transistor Tr1 and an OFF failure of the third transistor Tr3 are detected based on the monitoring results. For example, when the first transistor Tr1 in the conductive state has an OFF failure caused therein, an electric current flowing from the first transistor Tr1 to the positive terminal side system main relay SMRB is cut off, or interrupted. In such a case, a cathode voltage Vc of the diode D1 may have higher value than an anode voltage Va of the diode D1, due to an induced voltage by the relay coil of the positive terminal side system main relay SMRB. Therefore, the first calculator 13 and the second calculator 14 can detect the OFF failure of the first transistor Tr1 based on a monitoring result of Va<Vc. Alternatively, the first calculator 13 and the second calculator 14 may detect the OFF failure of the first transistor Tr1, based on a monitoring result of un-match between (i) a potential difference between the anode voltage Va and the cathode voltage Vc of the diode D1 and (ii) a forward voltage drop of the diode D1. Similarly, the first calculator 13 and the second calculator 14 may also detect an OFF failure of the second transistor Tr2.

The output circuit 18 outputs the relay drive signals to the positive and negative terminal side system main relays SMRB and SMRG in response to the second relay control signal output from the second calculator 14. More specifically, the output circuit 18 includes a fourth transistor Tr4 for outputting the relay drive signal to the positive terminal side system main relay SMRB, and a fifth transistor Tr5 for outputting the relay drive signal to the negative terminal side system main relay SMRG. The second calculator 14 outputs drive signals for turning ON the fourth and fifth transistors Tr4 and Tr5 as the second relay control signal. That is, the output circuit 18, which is a power supply circuit that outputs a relay drive signal to each of the system main relays SMRB and SMRG in response to the second relay control signal from the second calculator 14, does not have a configuration to output the relay drive signal to the startup system main relay SMRP.

An output from the source of the fourth transistor Tr4 of the output circuit 18 is connected to a connection line connecting the first transistor Tr1 of the output circuit 17 and the positive terminal side system main relay SMRB. The output circuit 18 includes a diode D3. The diode D3 is disposed at a position closer to the source of the fourth transistor Tr4 than a junction point where an output from the source of the fourth transistor Tr4 merges with the above-described connection line. Similarly, an output from the source of the fifth transistor Tr5 of the output circuit 18 is connected to a connection line connecting the third transistor Tr3 and the negative terminal side system main relay SMRG. The output circuit 18 includes a diode D4. The diode D4 is disposed at a position closer to the source of the fifth transistor Tr5 than a junction point where the output from the source of the fifth transistor Tr5 merges with the above-described connection line. These diodes D3 and D4 are provided to prevent an electric current from flowing into the output circuit 18 from the output circuit 17. Although not shown in FIG. 1, in the output circuit 18, it may be configured to obtain the inter-terminal potentials of both ends of the diodes D3 and D4 into the first calculator 13 and the second calculator 14 for detecting an OFF failure of the transistors Tr4 and Tr5.

The power supply circuit 19 includes a power supply IC 20, an OR circuit 21, a transistor 22, and a relay circuit 23. The power supply circuit 19 is provided to enable a continuous power supply to each of the circuits in the electronic control unit 10, including the first calculator 13 and the second calculator 14, even when the start switch 3 of the vehicle is turned OFF.

The power supply IC 20 is constantly supplied with an electric power from the in-vehicle battery 4, and is operable even when the start switch 3 is turned OFF. While receiving a power supply instruction signal from the first calculator 13 and/or from the second calculator 14, the power supply IC 20 outputs an ON signal for turning ON the transistor 22 to the OR circuit 21 which is described later.

In addition to the ON signal output from the power supply IC 20 described above, a voltage signal from the in-vehicle battery 4 is input to the OR circuit 21 via the start switch 3. An output of the OR circuit 21 is connected to the base of the transistor 22, which is connected to a coil of the relay circuit 23. The OR circuit 21 outputs a high level signal when at least one of the ON signal from the power supply IC 20 and the voltage signal from the in-vehicle battery 4 is input. When the high level signal is output from the OR circuit 21, the transistor 22 is turned ON. Then, an electric current flows in the coil of the relay circuit 23, and a contact of the relay circuit 23 is turned ON. Thereby, as shown in FIG. 1, an electric power is supplied to each of the circuits in the electronic control unit 10, including the first calculator 13 and the second calculator 14 in addition to the output circuits 17 and 18, and each of the circuits becomes operable.

On the other hand, when neither the ON signal from the power supply IC 20 nor the voltage signal from the in-vehicle battery 4 is input to the OR circuit 21, the output signal from the OR circuit 21 becomes low level. Then, the transistor 22 is turned OFF, thereby the power supply to the coil of the relay circuit 23 is stopped. As a result, the contact of the relay circuit 23 is turned OFF, and the power supply to each of the circuits in the electronic control unit 10 is stopped. Note that the power supply circuit 19 provided in the electronic control unit 10 in an example of FIG. 1 may also be provided outside the electronic control unit 10.

Further, as shown in FIG. 1, the voltage signal from the in-vehicle battery 4 via the start switch 3 is also given to the input circuits 11 and 12. Thereby, the first calculator 13 and the second calculator 14 can detect that the start switch 3 is turned OFF. The first calculator 13 and the second calculator 14 output a power supply instruction signal to the power supply IC 20 when the start switch 3 is turned ON to start the power supply. Thereby, each of the circuits in the electronic control unit 10 including the first calculator 13 and the second calculator 14 can continue the operation even when the start switch 3 is turned OFF.

Figure 2:
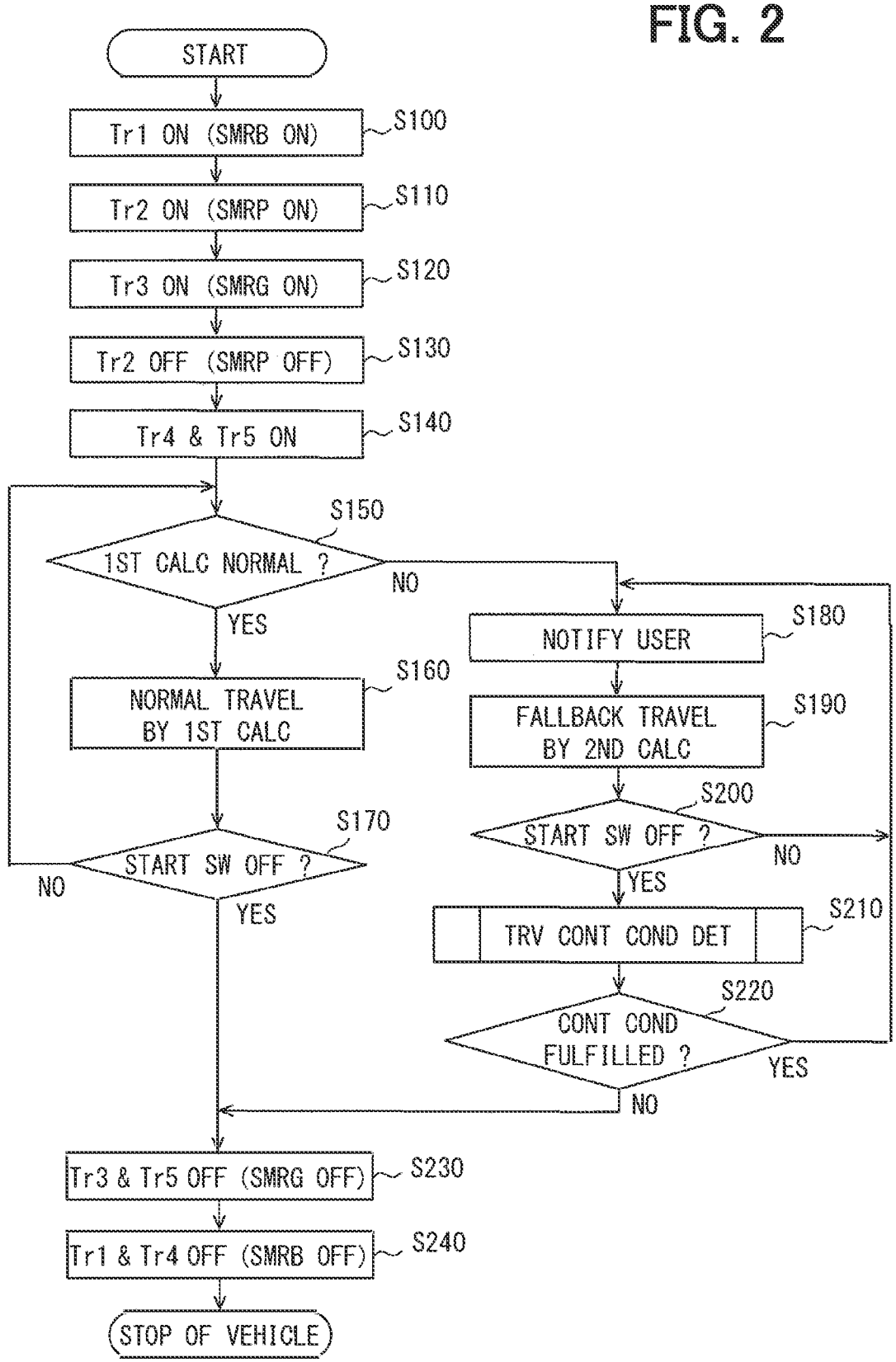
FIG. 2 is a flowchart of control performed by a first calculator and a second calculator of the electronic control unit.

Next, a control process performed by the first calculator 13 and the second calculator 14 in the electronic control device 10 having the above-described configuration is described with reference to a flowchart of FIG. 2, timing charts of FIG. 3 and FIG. 4. The flowchart shown in FIG. 2 is started when the start switch 3 of the vehicle is turned ON.

First, at first step S100, the first calculator 13 outputs a drive signal for turning ON the first transistor Tr1. As a result, an electric current is supplied to the relay coil of the positive terminal side system main relay SMRB, and the relay switch of the positive terminal side system main relay SMRB is turned ON. In the timing chart of FIG. 3, after the turning ON of the first transistor Tr1, the positive terminal side system main relay SMRB is turned ON with a delay by a time constant of the coil, a delay time due to a mechanical moment of the device movement, and a relay operation time caused by a switching of a contact.

Next, at step S110, the first calculator 13 outputs a drive signal for turning ON the second transistor Tr2. As a result, an electric current is supplied to the relay coil of the startup system main relay SMRP, and the relay switch of the startup system main relay SMRP is turned ON. The timing chart of FIG. 3 shows that the startup system main relay SMRP is turned ON with a delay of the relay operation time after the turning ON of the second transistor Tr2. Note that a timing at which the first calculator 13 outputs a drive signal to the second transistor Tr2 is set so that the startup system main relay SMRP is turned ON at a predetermined time (e.g., 100 to 150 ms) after the turning ON of the positive terminal side system main relay SMRB.

By turning ON the positive terminal side system main relay SMRB and the startup system main relay SMRP, the high voltage battery 5 and the inverter 30 are electrically connected, and an electric current flows between them. However, a resistor R is connected in series to the startup system main relay SMRP. Therefore, it is possible to suppress a flow of a large current immediately after the turning ON of the startup system main relay SMRP which is caused by a rush current at the startup time, and it is also possible to prevent a problem such as melting of the relay contacts.

Next, at step S120, the first calculator 13 outputs a drive signal for the turning ON of the third transistor Tr3. As a result, an electric current is supplied to the relay coil of the negative terminal side system main relay SMRG, and the relay switch of negative terminal side system main relay SMRG is turned ON. The timing chart of FIG. 3 also shows that, after the turning ON of the third transistor Tr3, the negative terminal side system main relay SMRG is turned ON with a delay by the relay operation time. Note that the timing at which the first calculator 13 outputs a drive signal to the third transistor Tr3 is also set so that the negative terminal side system main relay SMRG is turned ON after a predetermined time (for example, 100 to 150 ms) from the turning ON of the startup system main relay SMRP.

At a subsequent step S130, the first calculator 13 stops the drive signal having been output to the second transistor Tr2, and turns OFF the second transistor Tr2. As a result, as shown in the timing chart of FIG. 3, the startup system main relay SMRP is turned OFF with a delay by a relay return time. The timing at which the drive signal to the second transistor Tr2 is stopped is set so that the startup system main relay SMRP is turned OFF after a predetermined time (for example, 20 to 30 ms) from the turning ON of the negative terminal side system main relay SMRG.

Then, at step S140, the second calculator 14 outputs drive signals for turning ON of the fourth transistor Tr4 and the fifth transistor Try. More specifically, after the turning OFF of the second transistor Tr2, for example, the first calculator 13 notifies the second calculator 14 that the positive and negative terminal side system main relays SMRB and SMRG are respectively in the conductive state. Based on such a notification, the second calculator 14 outputs driving signals for turning ON of the fourth and fifth transistors Tr4 and Tr5. Thus, the second calculator 14 can turn ON the fourth and fifth transistors Tr4 and Tr5 after confirming that the positive and negative terminal side system main relays SMRB and SMRG are respectively in the conductive state.

As a result, a power supply to the relay coil of the positive terminal side system main relay SMRB is performed in two systems, i.e., via a system having the first transistor Tr1 and via a system having the fourth transistor Tr4. Further, a power supply to the relay coil of the negative terminal side system main relay SMRG is performed in two systems, i.e., via a system having the third transistor Tr3 and via a system having the fifth transistor Tr5. Therefore, even when a transistor in one of the two systems suffers from an OFF failure, for example, an ON state of the positive and negative terminal side system main relays SMRB and SMRG is maintained. Further, when the first calculator 13 has an abnormality, for example, and the second calculator 14 is reset and a drive signal for turning ON the first and third transistors Tr1 and Tr3 (i.e., the first relay control signal) is not output from the first calculator 13, the fourth and fifth transistors Tr4 and Tr5 are kept in an ON state by the drive signal (i.e., the second relay control signal) output from the second calculator 14. Therefore, even when an abnormality occurs in the first calculator 13, the ON state of the positive and negative terminal side system main relays SMRB and SMRG is maintained. As a result, even when a failure or abnormality as described above occurs, an electric power is continuously suppliable to the inverter 30 that drives the travel motor 31.

Note that the second calculator 14 does not necessarily have to turn ON the fourth and fifth transistors Tr4 and Tr5 simultaneously. For example, the second calculator 14 may turn ON the fourth transistor Tr4 at any timing after the first calculator 13 turns ON the positive terminal side system main relay SMRB. Similarly, the second calculator 14 may turn ON the fifth transistor Tr5 at any timing after the first calculator 13 turns ON the negative-terminal side system main relay SMRG.

Figure 3:
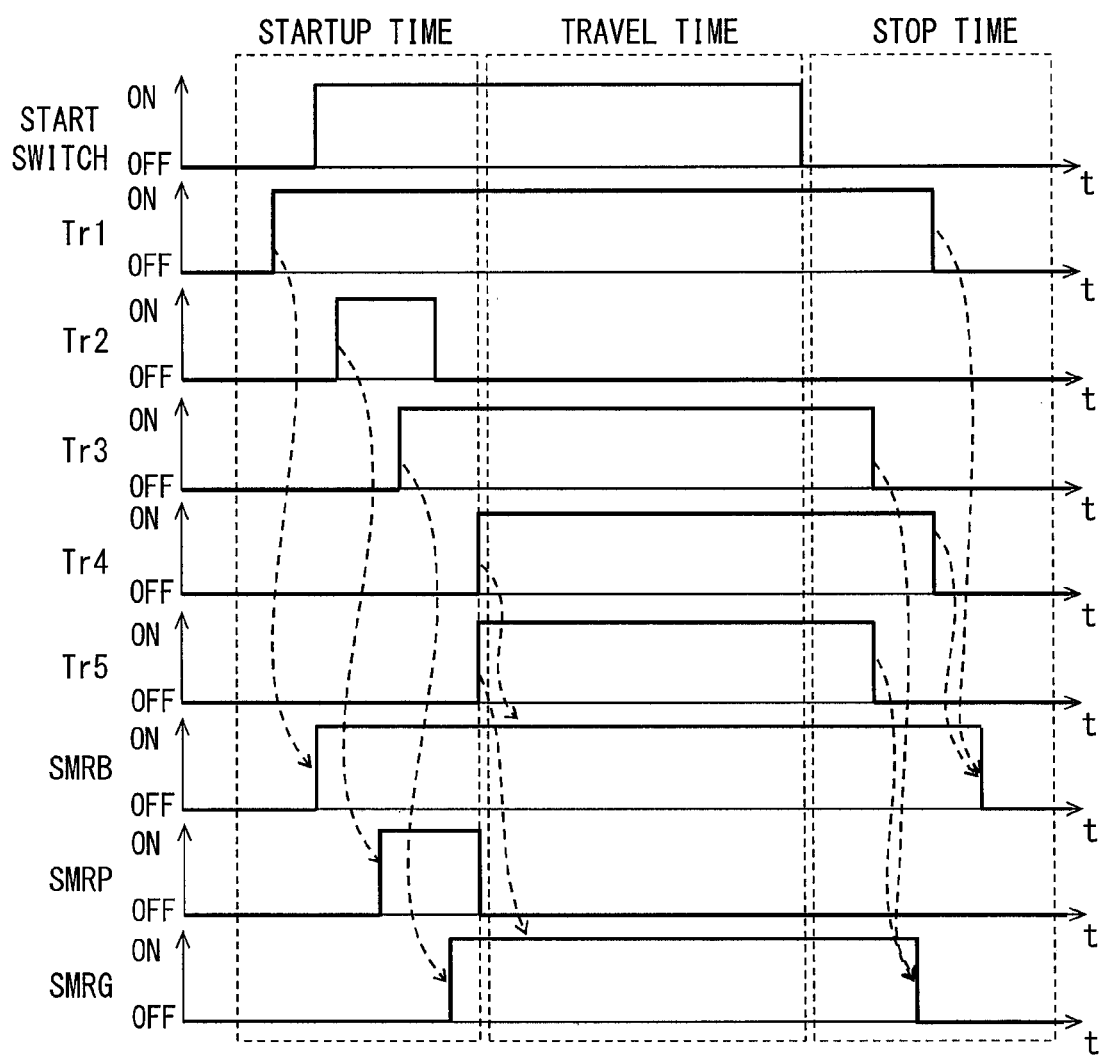
FIG. 3 is a timing chart of a relay control performed by the first calculator and the second calculator.
Figure 4:
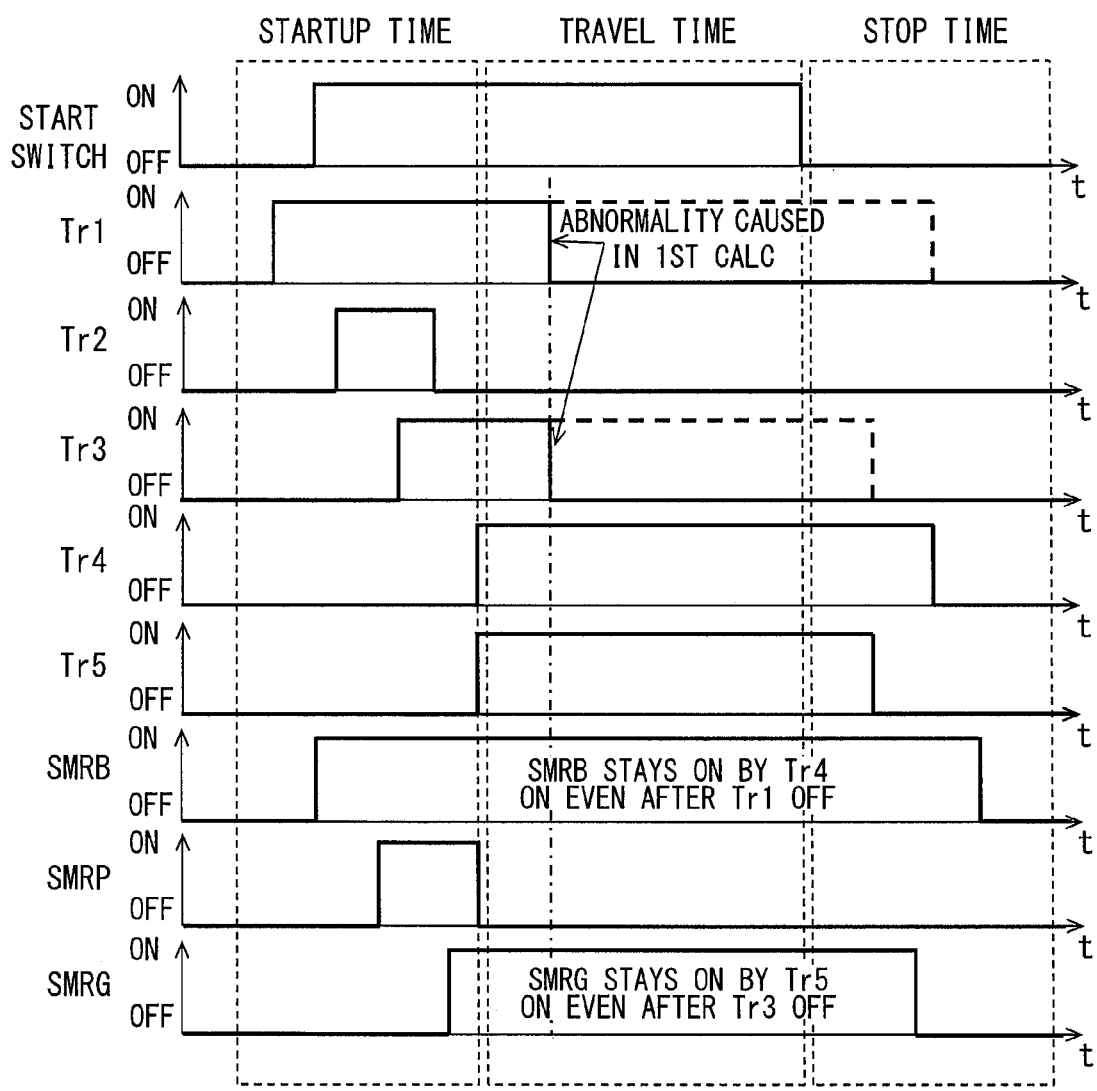
FIG. 4 is a timing chart of relay drive signals output from first and third transistors and states of positive terminal side and negative terminal side system main relays when an operation of the first calculator is abnormal and a reset is performed.

The process at steps S100 to S140 corresponds to the process at the startup time in the timing chart of FIG. 3. When the process at the startup time is complete, the vehicle becomes travelable by the travel motor 31 that serves as a source of the travel power.

At a subsequent step S150, the second calculator 14 determines whether an operation of the first calculator 13 is normal. In such a determination, the second calculator 14 determines, when (i.e., based on) determining that the operation of the first calculator 13 is abnormal by its own monitor function as described above and receiving a normal signal from the monitoring IC 16, that the operation of the first calculator 13 is abnormal, and otherwise determines that the operation of the first calculator 13 is normal. When it is determined in the process of step S150 that the operation of the first calculator 13 is normal, the process proceeds to step S160. On the other hand, when it is determined that the operation of the first calculator 13 is abnormal, the process proceeds to step S180.

At step S160, the first calculator 13 performs an inverter control. In such a case, if the second calculator 14 is also operating normally, as shown in the timing chart of FIG. 3, a power supply to the relay coil of the positive terminal side system main relay SMRB is performed in two systems, i.e., via a system having the first transistor Tr1 and via a system having the fourth transistor Tr4. Further, the relay coil of the negative terminal side system main relay SMRG receives a power supply in two systems, i.e., via a system having the third transistor Tr3 and via a system having the fifth transistor Try. Therefore, the inverter 30 is in a state where an electric power for driving the travel motor 31 is supplied from the high voltage battery 5. In such a state, the first calculator 13 calculates a target torque to be generated by the travel motor 31 based on the various inputs from the sensors. Then, the first calculator 13 outputs, to the inverter 30, an instruction signal indicating a drive signal for generating the target torque. As a result, the travel motor 31 generates the torque corresponding to an operation of the accelerator pedal by the driver or an operation of the brake pedal by the driver, as the normal travel control.

At a subsequent step S170, the first calculator 13 determines whether the start switch 3 of the vehicle is turned OFF. When the first calculator 13 determines that the starting switch 3 has been turned OFF, the process proceeds to step S230 in order to perform a stop process. On the other hand, when the first calculator 13 determines that the start switch 3 is not turned OFF, the process returns to step S150 in order to continue the inverter control, that is, the control of the travel motor 31.

At step S230, in order to turn OFF the negative terminal side system main relay SMRG, the first calculator 13 stops the drive signal to the third transistor Tr3, and the second calculator 14 stops the drive signal to the fifth transistor Tr5. The stopping of these drive signals is performed almost simultaneously in the first and second calculators 13 and 14. As a result, as shown in the timing chart of FIG. 3, the negative terminal side system main relay SMRG is turned OFF with a delay of the relay return time after the turning OFF of the third and fifth transistors Tr3 and Tr5.

Next, at step S240, in order to turn OFF the positive terminal side system main relay SMRB, the first calculator 13 stops the drive signal to the first transistor Tr1, and the second calculator 14 stops the drive signal to the fourth transistor Tr4. The stopping of these drive signals is performed almost simultaneously in the first and second calculators 13 and 14. As a result, as shown in the timing chart of FIG. 3, the positive terminal side system main relay SMRB is turned OFF with a delay of the relay return time after the turning OFF of the first and fourth transistors Tr1 and Tr4.

The process of steps S230 to S240 corresponds to the process at the stop time in the timing chart of FIG. 3. By such a stop time process, the high voltage battery 5 and the inverter 30 are electrically disconnected, and the vehicle stops. Note that the first calculator 13 and the second calculator 14 instruct a turning OFF of power supply to the power supply IC 20 after turning OFF the negative system main relay SMRG and the positive system main relay SMRB. Then, the power supply IC 20 stops the input of the voltage signal to the OR circuit 21. Along with the stop of the voltage signal, the power supply to each of the circuits in the electronic control unit 10 is also stopped.

At step S180, which is performed when the operation of the first calculator 13 is determined to be abnormal at step S150, a warning lamp in the meter cluster is used (i.e., is turned ON) to notify, to a user, that the first calculator 13 has an abnormality. Then, at step S190, the second calculator 14 performs an inverter control. In such a case, as shown in the timing chart of FIG. 4, since the first calculator 13 is continuously reset by the second calculator 14, the first calculator 13 stops the drive signal to the first transistor Tr1 and stops the drive signal to the third transistor Tr3. However, by a power supply to the relay coil from a system having the fourth transistor Tr4, the positive terminal side system main relay SMRB can maintain the conductive state, and by a power supply to the relay coil from the system having the fifth transistor Try, the negative terminal side system main relay SMRG can maintain the conductive state. Therefore, the inverter 30 is in a state where an electric power for driving the travel motor 31 is supplied from the high voltage battery 5. In such a state, the second calculator 14 performs an inverter control for performing a so-called fallback travel for enabling the vehicle to travel to a safe area by the travel motor 31 based on the various inputs from the sensors. In such manner, it is possible to prevent the vehicle from stopping at the time of having abnormality in the first calculator 13.

At a subsequent step S200, the second calculator 14 determines whether or not the start switch 3 of the vehicle is turned OFF. When it is determined that the start switch 3 is turned OFF, the process proceeds to step S210. On the other hand, when the second calculator 14 determines that the start switch 3 is not turned OFF, the process returns to step S210 in order to continue the fallback travel control.

At step S210, it is determined whether a predetermined travel continuation condition is fulfilled. When a determination result that the travel continuation condition is fulfilled is obtained at step S210, an affirmative determination is made at a subsequent step S220, and the process returns to step S180. On the other hand, when a determination result that the travel continuation condition is not fulfilled is obtained at step S210, a negative determination is made at step S220, and the process proceeds to the vehicle stop process of step S230 and thereafter.

That is, the travel continuation condition determination process of step S210 determines whether the power supply to the inverter 30 via the positive and negative terminal side system main relays SMRB and SMRG should be maintained even when the start switch 3 is turned OFF for enabling the fallback travel of the vehicle by the second calculator 14. That is, when it is determined that a fallback travel performable state should be maintained, it is determined that the travel continuation condition is fulfilled, and, when it is determined that the fallback travel performable state needs not be maintained, it is determined that the travel continuation condition is not fulfilled.

Here, it is also conceivable that a user surprised by the notification of the occurrence of the abnormality in the first calculator 13 at the above-described step S180 may erroneously turn OFF the start switch 3. In response to the turning OFF of the start switch 3, an immediate turning OFF of the positive and negative terminal side system main relays SMRB and SMRG by performing the stop process of step S230 and thereafter may lead to a situation in which the positive side and negative terminal side system main relays SMRB, SMRG cannot be turned ON thereafter, even when the start switch 3 is turned ON again for a drive operation of the vehicle by the driver. The reason of the above is that only the first calculator 13 can perform the connection sequence of the three system main relays SMRB, SMRG, SMRP at the startup time, which is, in other words, that the first calculator 13 having an abnormality might be not capable of properly performing the connection sequence.

Therefore, in the present embodiment, as described above, even when the start switch 3 of the vehicle is turned OFF, the second calculator 14 continues to maintain the positive and negative terminal side system main relays SMRB and SMRG in the conductive state when the predetermined travel continuation condition is fulfilled, thereby (i) maintaining the power supply to the inverter 30 and (ii) continuing the fallback travel performable state by the second calculator 14. Therefore, even when the start switch 3 is turned ON again by the driver, an electric power is supplied (i.e., is being supplied) to inverter 30 via the positive and negative terminal side system main relays SMRB and SMRG, thereby enabling the second calculator 14 to perform a fallback travel control for the travel of the vehicle.

FIG. 5 is a flowchart of the details of the travel continuation condition determination process. Hereinafter, the travel continuation condition determination process is described based on the flowchart of FIG. 5.

At first step S300, based on a voltage and charging and discharging current of the high voltage battery 5, whether the charge amount of the high voltage battery 5 is within an appropriate range between a predetermined upper limit value and a predetermined lower limit value is determined (S300:"BATT SOC [State of charge] APPROPRIATE" in FIG. 5). When the charge amount of the high voltage battery 5 is out of the appropriate range, the second calculator 14 may cause deterioration or failure of the high voltage battery 5 by performing a fallback travel control. Therefore, when it is determined at step S300 that the charge amount of the high voltage battery 5 is out of the appropriate range, the process proceeds to step S350, and it is determined that the travel continuation condition is not fulfilled. On the other hand, when it is determined that the charge amount of the high voltage battery 5 is within the appropriate range, the process proceeds to step S310. At step S310, it is determined whether the operation of the inverter 30 and the travel motor 31 is normal. For example, when an ON failure or an OFF failure is occurring in any of the switching elements constituting the inverter 30, or when a disconnection or a short circuit is occurring in any phase of the travel motor 31, the inverter 30 and/or the travel motor 31 is determined as not normal. When it is determined that the operation of the inverter 30 and the travel motor 31 is normal, the process proceeds to step S320. When it is determined that the operation is not normal, the process proceeds to step S350 to determine that the travel continuation condition is not fulfilled. As described above, the requirements at steps S300 and S310 are requirements for a determination of whether the vehicle is travelable (i.e., a travel of the vehicle is continuable) by the fallback travel control of the second calculator 14, which may be described as travel continuation enabling requirements. Thus, the travel continuation condition includes the travel continuation enabling requirements.

At step S320, it is determined whether the driver of the vehicle has an intention to continue a travel of the vehicle. When it is determined that the driver of the vehicle does not have an intention to continue a travel of the vehicle, the process proceeds to step S350, and it is determined that the travel continuation condition is not fulfilled. On the other hand, when it is determined that the driver of the vehicle has an intention to continue a travel, the process proceeds to step S330. Thus, the travel continuation condition includes a driver's intention to continue a travel of the vehicle.

The presence or absence of the driver's intention to continue a travel can be determined, for example, based on whether the conditions shown in FIG. 6 are fulfilled. According to the example in FIG. 6, when the condition shown in FIG. 6 is fulfilled, it is determinable that there is no intention to continue a travel, and, when the condition shown in FIG. 6 is not fulfilled, it is determinable that there is an intention to continue the travel. The condition shown in FIG. 6 is described in the following.

Under the condition shown in FIG. 6, first, a vehicle stops (i.e., the vehicle speed is equal to or less than a predetermined value), a shift range of the transmission is in parking, a seat belt of the driver's seat is not worn, and a driver seat door is open. When it is determined that the condition is fulfilled, it is determined that the driver of the vehicle does not have an intention to continue a travel. Also, when the vehicle stops, the shift range of the transmission is in parking, and it is considered that the driver of the vehicle has gotten off the vehicle by a smart key removal determination, it is considered that the condition is fulfilled, and the driver of the vehicle is determined as not having an intention to continue a travel. It should be noted that the getting off of the driver from the vehicle to the outside of the vehicle may also be determinable, for example, based on an image captured by a camera that is used to capture an in-vehicle image and an outside image of the vehicle. Furthermore, when the vehicle stops, the shift range of the transmission is in parking, and a predetermined time has elapsed from the turning OFF of the start switch 3 of the vehicle, it is considered that the condition is fulfilled and the driver of the vehicle does not have an intention to continue a travel. Of course, the intention to travel can be based on only one or multiple of these criteria. Conversely, when none of the above-mentioned conditions is fulfilled, it is determined that the driver of the vehicle has an intention to continue a travel.

At a subsequent step S330, it is determined whether a vehicle environment is safe. When it is determined that the vehicle environment is safe, the process proceeds to step S350, and it is determined that the travel continuation condition is not fulfilled. Conversely, when it is determined that the vehicle environment is not safe, the process proceeds to step S340, and it is determined that the travel continuation condition is fulfilled. Thus, the travel continuation condition includes that the vehicle environment is not safe.

Whether or not the vehicle environment is safe may be determined, for example, by examining whether or not a condition shown in FIG. 7 is fulfilled. According to an example in FIG. 7, the vehicle environment is determinable as safe when the condition shown in FIG. 7 is fulfilled, and the vehicle environment is determinable as not safe when the condition shown in FIG. 7 is not fulfilled. The condition shown in FIG. 7 is described in the following.

Under the condition shown in FIG. 7, first, when the vehicle stops (i.e., the vehicle speed is equal to or less than a predetermined value) and a place where the vehicle stops is a retreat space of an expressway, it is considered that the condition is fulfilled, and the vehicle environment is determined as safe. In addition, information regarding the place where the vehicle stops may be acquired from a navigation apparatus in the same vehicle, for example. Alternatively, the electronic control unit 10 may have a map database and a current position detection device such as a GPS. Further, when the vehicle stops and the place of the vehicle stop is a service area (SA) or a parking area (PA) of the expressway, the condition is considered as fulfilled, and the vehicle environment vehicle is determined as safe. Alternatively again, when the vehicle stops and the place of the vehicle stop is a parking lot (e.g., a parking lot of a shop, a convenience store, a gas station, a car park or the like), the condition is considered as fulfilled and the vehicle environment is determined as safe. That is, the second calculator 14 determines that the vehicle environment is safe when the vehicle stops in an area that can be considered as safe, and otherwise determines that the vehicle environment is not safe.

As described above, in the present embodiment, the travel continuation condition is determined from a viewpoint of the travel continuation intention of the driver and the vehicle environment. Therefore, in a situation that the driver erroneously turns OFF the start switch 3 when the vehicle should not be stopped, the travel continuation condition is fulfilled as long as the travel continuation enabling requirement is fulfilled. Therefore, even when the start switch 3 is turned OFF by mistake, the driver of the vehicle can drive the vehicle to a safe place by the fallback travel control of the second calculator 14.

FIG. 8 is a timing chart of an example of control by the second calculator 14 when an abnormality occurs in the first calculator 13 and the driver erroneously turns OFF the start switch 3. In the example illustrated in FIG. 8, the driver has turned OFF the start switch 3 due to a notification of the occurrence of an abnormality in the first calculator 13. However, when the start switch 3 is turned OFF, the travel continuation condition is fulfilled, such as the intention to continue a travel, thereby the positive and negative terminal side system main relays SMRB and SMRG have been maintained in the conductive state by the second calculator 14. Therefore, when the driver turns ON the start switch 3 thereafter, the second calculator 14 can perform the fallback travel control, and the driver can move the vehicle to a safe place. At the safe place, the driver got off the vehicle. Therefore, it is determined that the condition is fulfilled, in view of the stop of the vehicle, a shift range is in P range, the seat belt of the driver's seat not worn (i.e., a buckle switch OFF), and a driver seat door open, and it is determined that the driver does not have an intention to continue a travel. As a result, it is determined that the travel continuation condition is determined as not fulfilled, thereby the vehicle stop process is performed, and the positive and negative terminal side system main relays SMRB and SMRG are turned OFF.

Figure 9:
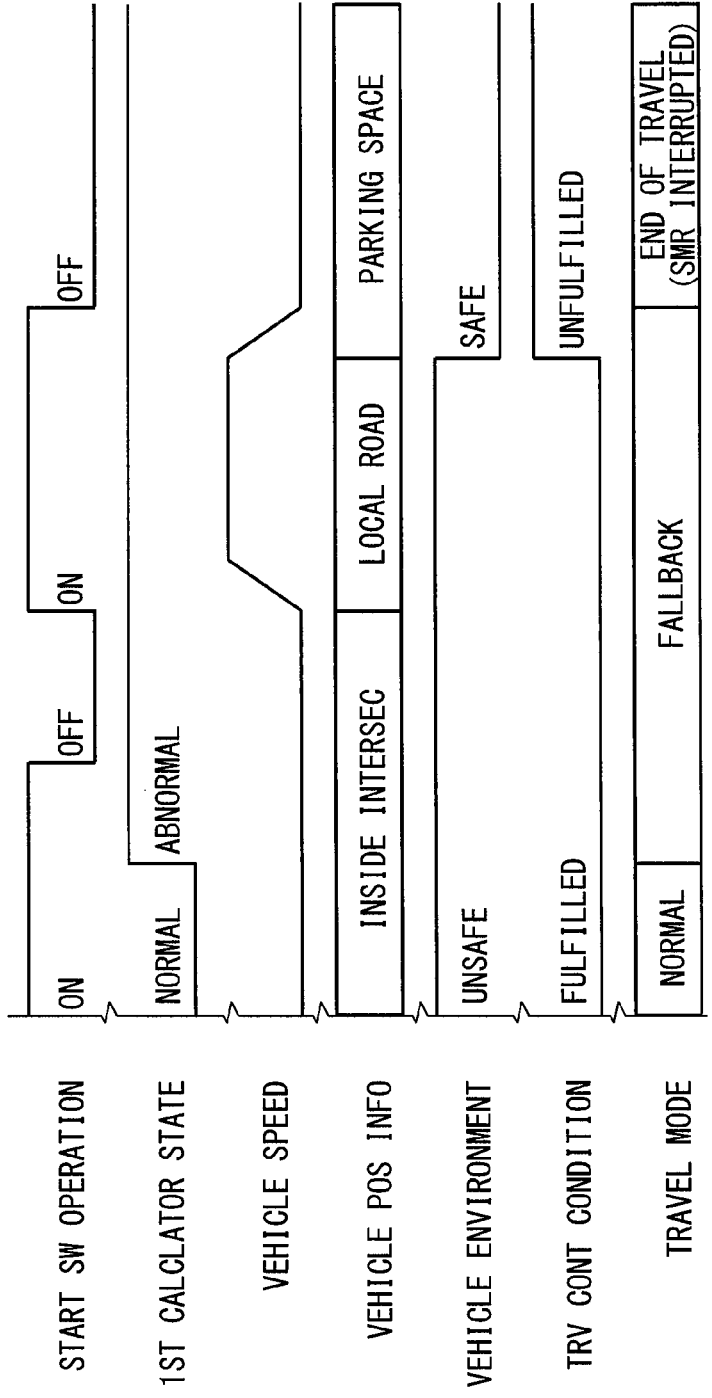
FIG. 9 is a timing chart of another example of control by the second calculator when an abnormality occurs in the first calculator and the driver turns OFF the start switch by mistake.

Further, the timing chart of FIG. 9 is another example of control by the second calculator 14 when an abnormality occurs in the first calculator 13 and the driver turns OFF the start switch 3 by mistake. In the example shown in FIG. 9, when the vehicle stops at an intersection, an abnormality occurs in the first calculator 13, and the driver turns OFF the start switch 3 upon seeing a notification of the abnormality occurrence. However, when the start switch 3 is turned OFF, the travel continuation condition including that the vehicle environment is not safe is fulfilled, thereby the positive and negative terminal side system main relays SMRB and SMRG are maintained in the conductive state by the second calculator 14. Therefore, when the driver turns ON the start switch 3 thereafter, the second calculator 14 can perform the fallback travel control. Then, the driver can drive the vehicle to a safe parking lot, and, in that parking lot, the start switch 3 is turned OFF. Therefore, it is determined that the vehicle environment is safe, i.e., the condition fulfilled in terms of vehicle stop and stop place being a parking lot. As a result, it is determined that the travel continuation condition is determined as not fulfilled, thereby the vehicle stop process is performed, and the positive and negative terminal side system main relays SMRB and SMRG are turned OFF.

As described above, according to the electronic control unit 10 of the present embodiment, even when the driver erroneously turns OFF the start switch 3, the second calculator 14 operates to maintain the positive and negative terminal side system main relays SMRB and the SMRG in the conductive state, the fallback travel control by the second calculator 14 is performable, and the driver can drive the vehicle to a safe place.

The preferred embodiments of the present disclosure have been described in the above. However, the present disclosure is not limited to the above-described embodiments, and various modifications can further be made without departing from the scope of the present disclosure.

In the electronic control unit 10 according to the above-described embodiment, the output circuit 18 includes the fourth transistor Tr4 for outputting the relay drive signal to the positive terminal side system main relay SMRB and the fifth transistor Tr5 for outputting the relay drive signal to the negative terminal side system main relay SMRG. However, in the output circuit 18, one transistor may be sharingly used (i) for outputting a relay drive signal to the positive terminal side system main relay SMRB and (ii) for outputting a relay drive signal to the negative terminal side system main relay SMRG. In such manner, the configuration of the output circuit 18 can be simplified.

Further, in the electronic control unit 10 according to the above-described embodiment, the output circuit 17 for outputting the relay drive signal in response to the first relay control signal from the first calculator 13 and the output circuit 18 for outputting the relay drive signal in response to the second relay control signal from the second calculator 14 are provided.

However, one output circuit may be shared by the first calculator 13 and the second calculator 14. In other words, (i) a drive signal line from the first calculator 13 and (ii) a drive signal line from the second calculator 14 may be connected to the same gate of a first shared transistor for outputting a relay drive signal to the positive terminal side system main relay SMRB, and (iii) the drive signal line from the first calculator 13 and (iv) the drive from the second calculator 14 may also be connected to the same gate of a second shared transistor for outputting a relay drive signal to the negative terminal side system main relay SMRG. Even with such a configuration, a situation, where an electric power from the high voltage battery 5 to the inverter 30 cannot be supplied when an abnormality occurs in the first calculator 13, is avoidable.

Further, in the embodiment described above, two relays of the positive terminal side system main relay SMRB and the startup system main relay SMRP are interposed in between the high voltage battery 5 and the inverter 30 at the startup time, and two relays, the positive terminal side system main relay SMRB and the negative terminal side system main relay SMRG, are interposed therebetween during a travel of the vehicle. However, the number of relays to be interposed at the startup time and during a travel of the vehicle may also be only one. In such a case, a system main relay having a resistor connected in series may be interposed at a position in between the high voltage battery 5 and the inverter 30 at the startup time to restrict the electric current, and a system main relay having no resistor may be interposed therebetween during a travel of the vehicle.

Further, in the above-described embodiment, the second calculator 14 maintains the positive and negative terminal side system main relays SMRB and SMRG in the conductive state when the travel continuation condition is fulfilled, i.e., when (i) the driver of the vehicle has an intention to continue a travel the vehicle and (ii) the vehicle environment is not safe. However, the second calculator 14 may maintain the positive and negative terminal side system main relays SMRB and SMRG in the conductive state when either one of the two requirements (i) and (ii) described above is fulfilled.

What is claimed is:

1. An electronic control unit used in a vehicle having a high voltage battery and an inverter that drives a vehicle travel-power motor for a travel of a vehicle, an electrical connection between the high voltage battery and the inverter switchable to be connected in a conductive state and disconnected in an interrupted state via a relay unit, the electronic control unit comprising:
   a first relay in the relay unit being kept in a conductive state while the vehicle is traveling;
   a second relay in the relay unit put in the conductive state when a start switch of the vehicle is switched ON, for flowing an electric current between the high voltage battery and the inverter, an amount of the electric current flowing via the second relay being restricted to-be lower than an amount of the electric current flowing in the conductive state of the first relay;
   a first calculator
      (a) configured to enable a travel of the vehicle by outputting an inverter control signal to the inverter for driving the vehicle travel-power motor, and
      (b) configured to control the first and second relays to
         (i) put the second relay in the conductive state when the start switch of the vehicle is switched ON at a startup time, and thereafter
         (ii) put the first relay in the conductive state in place of the second relay and maintain the conductive state of the first relay; and
   a second calculator provided independently from the first calculator, configured to output the inverter control signal to the inverter when the first calculator is abnormal, and control the first relay to be kept in the conductive state, wherein:

the second calculator maintains the conductive state of the first relay even after switching OFF of the start switch when the start switch of the vehicle is switched OFF and a travel continuation condition is fulfilled, and switches the first relay to the interrupted state when the travel continuation condition is not fulfilled, the travel continuation condition is fulfilled when each travel continuation enabling requirement is satisfied, and the travel continuation condition is unfulfilled when any travel continuation enabling requirement is not satisfied, the travel continuation condition includes criteria in which travel of the vehicle is continuable by the vehicle travel-power motor under the inverter control performed by the second calculator, and the second calculator is configured to perform an inverter control resulting in a fallback travel of the vehicle that is a movement of the vehicle to a safe area as determined by one or more of at least one vehicle sensor, a map database, and a Global Positioning System (GPS), the fallback travel being more limited than a normal travel of the vehicle.

2. The electronic control unit of claim 1, wherein
the second calculator determines that travel of the vehicle is continuable by the vehicle travel-power motor on the inverter control performed by the second calculator when a charge amount of the high voltage battery is kept within a preset, normal range.

3. The electronic control unit of claim 1, wherein
the second calculator determines that travel of the vehicle is continuable by the vehicle travel-power motor under the inverter control performed by the second calculator when the vehicle travel-power motor and the inverter are normally operating.

4. The electronic control unit of claim 1, wherein
the travel continuation condition includes a travel continuation enabling requirement that an environment of the vehicle is not safe for stopping, as determined at least partly based on at least one of: a vehicle sensor, a map database, and a Global Positioning System (GPS).

5. The electronic control unit of claim 1, wherein
the travel continuation condition includes a travel continuation enabling requirement that a driver of the vehicle has an intention to continue travel of the vehicle, the intention being determined at least partly based on at least one vehicle sensor.

6. The electronic control unit of claim 1, wherein:
the second calculator has a monitor function for monitoring an operation of the first calculator, and
the second calculator performs the inverter control on behalf of the first calculator while resetting the first calculator upon determining that the operation of the first calculator is abnormal.

7. The electronic control unit of claim 1, wherein:
the first relay includes a positive terminal side relay disposed at a position between a positive terminal of the high voltage battery and the inverter, and a negative terminal side relay disposed at a position between a negative terminal of the high voltage battery and the inverter, and
the second relay includes the positive terminal side relay disposed at a position between the positive terminal of the high voltage battery and the inverter, and a current restriction relay series-connected with a resistor and disposed at a position between the negative terminal of the high voltage battery and the inverter.

8. The electronic control unit of claim 4, wherein
the second calculator determines that the vehicle environment is safe when the vehicle stops in a considered-as-safe area, or otherwise determines that the vehicle environment is unsafe.

9. The electronic control unit of claim 5, wherein
the second calculator
determines that the driver of the vehicle does not have an intention to continue travel of the vehicle when at least one of
(i) the vehicle stops,
(ii) a transmission shift range is in parking,
(iii) a seat belt of a driver's seat is not worn, or
(iv) a driver seat door is open, or
otherwise determines that the driver of the vehicle has an intention to continue travel of the vehicle.

10. The electronic control unit of claim 5, wherein
the second calculator
determines that the driver of the vehicle does not have an intention to continue travel of the vehicle when at least one of
(i) the vehicle stops,
(ii) a transmission shift range is in parking, or
(iii) the driver of the vehicle retreats from the vehicle, or
otherwise determines that the driver of the vehicle has an intention to continue travel of the vehicle.

11. The electronic control unit of claim 5, wherein
the second calculator
determines that the driver of the vehicle does not have an intention to continue travel of the vehicle when at least one of
(i) the vehicle stops,
(ii) a transmission shift range is in parking, or
(iii) a preset period of time has lapsed from a switch OFF of the start switch of the vehicle, or
otherwise determines that the driver of the vehicle has an intention to continue travel of the vehicle.

12. An electronic control unit used in a vehicle having a high voltage battery and an inverter that drives a vehicle travel-power motor for a travel of a vehicle, an electrical connection between the high voltage battery and the inverter switchable to be connected in a conductive state and disconnected in an interrupted state via a relay unit, the electronic control unit comprising:
a first relay in the relay unit being kept in a conductive state while the vehicle is traveling;
a second relay in the relay unit put in the conductive state when a start switch of the vehicle is switched ON, for flowing an electric current between the high voltage battery and the inverter;
a first calculator:
(a) configured to enable a travel of the vehicle by outputting an inverter control signal to the inverter for driving the vehicle travel-power motor, and
(b) configured to control the first and second relays to
(i) put the second relay in the conductive state when the start switch of the vehicle is switched ON at a startup time, and thereafter
(ii) put the first relay in the conductive state in place of the second relay and maintain the conductive state of the first relay; and
a second calculator provided independently from the first calculator, configured to output the inverter control signal to the inverter when the first calculator is abnormal, and control the first relay to be kept in the conductive state, wherein the second calculator maintains the conductive state of the first relay even after switching OFF of the start switch when the start switch of the vehicle is switched OFF and a travel continuation condition is fulfilled, and switches the first relay to the interrupted state when the travel continuation condition is not fulfilled, wherein the travel continuation condition is fulfilled when every travel continuation enabling requirement is satisfied, and the travel continuation condition is unfulfilled when at least one of the travel continuation enabling requirements is not satisfied, and wherein the travel continuation enabling requirements include a requirement that a travel continuation intention is yes, wherein the travel continuation intention is determined based at least partly on at least one of the following criteria:
(i) the vehicle is under a preset speed,
(ii) a shift range is in parking,
(iii) a driver seat belt is not worn,
(iv) a driver door is open,
(v) an offboard determination is made based on a smartkey, and
(vi) a preset lapse time has passed after the start switch was switched OFF.

13. The electronic control unit of claim 12, wherein the second calculator determines the travel continuation intention based at least partly on the following criteria:
(i) the vehicle is under the preset speed,
(ii) the shift range is in parking,
(iii) the driver seat belt is not worn, and
(iv) the driver door is open.

14. The electronic control unit of claim 12, wherein the second calculator determines the travel continuation intention based on at least partly on the following criteria:
(i) the vehicle is under the preset speed,
(ii) the shift range is in parking,
(iii) the driver seat belt is not worn, and
(v) the offboard determination is made based on the smartkey.

15. The electronic control unit of claim 12, wherein the second calculator determines the travel continuation intention based on at least partly on the following criteria:
(i) the vehicle is under the preset speed,
(ii) the shift range is in parking, and
(vi) the preset lapse time has passed after the start switch was switched OFF.

16. The electronic control unit of claim 12, wherein:
the second calculator has a monitor function for monitoring an operation of the first calculator, and
the second calculator performs the inverter control on behalf of the first calculator while resetting the first calculator upon determining that the operation of the first calculator is abnormal.

17. The electronic control unit of claim 12, wherein:
the first relay includes a positive terminal side relay disposed at a position between a positive terminal of the high voltage battery and the inverter, and a negative terminal side relay disposed at a position between a negative terminal of the high voltage battery and the inverter, and
the second relay includes the positive terminal side relay disposed at a position between the positive terminal of the high voltage battery and the inverter, and a current restriction relay series-connected with a resistor and disposed at a position between the negative terminal of the high voltage battery and the inverter.

* * * * *

UNITED STATES PATENT AND TRADEMARK OFFICE
CERTIFICATE OF CORRECTION

PATENT NO. : 11,012,020 B2
APPLICATION NO. : 16/595544
DATED : May 18, 2021
INVENTOR(S) : Yutaka Koyama It is certified that error appears in the above-identified patent and that said Letters Patent is hereby corrected as shown below:

On the Title Page

Item (12) should read:
--Koyama et al.--

Item (72) Inventors should read:
--Yutaka Koyama, Kariya-city (JP);
Keiji Kaita, Toyota-shi (JP);
Takahiko Hirasawa, Toyota-shi (JP)--

Signed and Sealed this
Twentieth Day of December, 2022

Katherine Kelly Vidal
*Director of the United States Patent and Trademark Office*